US010671689B2

(12) United States Patent
Sato et al.

(10) Patent No.: US 10,671,689 B2
(45) Date of Patent: Jun. 2, 2020

(54) NON-TRANSITORY STORAGE MEDIUM STORING INSTRUCTIONS READABLE BY INFORMATION PROCESSING APPARATUS, AND TWO-DIMENSIONAL-CODE CREATING SYSTEM

(71) Applicant: Brother Kogyo Kabushiki Kaisha, Nagoya-shi, Aichi-ken (JP)

(72) Inventors: Hirotaka Sato, Nagoya (JP); Susumu Fujiwara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 2 days.

(21) Appl. No.: 16/177,501

(22) Filed: Nov. 1, 2018

(65) Prior Publication Data

US 2019/0130044 A1    May 2, 2019

(30) Foreign Application Priority Data

Nov. 2, 2017 (JP) ................................. 2017-212414

(51) Int. Cl.
*G06F 15/16* (2006.01)
*G06F 16/955* (2019.01)
(Continued)

(52) U.S. Cl.
CPC ...... *G06F 16/9566* (2019.01); *G06F 16/9554* (2019.01); *G06F 16/9577* (2019.01); *G06K 19/06037* (2013.01)

(58) Field of Classification Search
CPC ............ G06F 16/9566; G06F 16/9577; G06F 16/9554; G06K 19/06037
See application file for complete search history.

(56) References Cited

U.S. PATENT DOCUMENTS

2012/0280031 A1* 11/2012 Nelson .................... G06F 3/002
235/375
2012/0314242 A1* 12/2012 Kakutani ............. G03G 21/046
358/1.14

(Continued)

FOREIGN PATENT DOCUMENTS

JP    2006-301919 A    11/2006
JP    2007-304652 A    11/2007
JP    2012-174205 A     9/2012

*Primary Examiner* — Philip B Tran
(74) *Attorney, Agent, or Firm* — Banner & Witcoff, Ltd.

(57) ABSTRACT

A non-transitory storage medium storing instructions readable by an information processing apparatus. When executed by the computer, the instructions cause the information processing apparatus to perform: executing an obtaining processing for obtaining a URL; executing a determining processing for determining whether the number of characters of a first URL obtained in the obtaining processing is less than a threshold value; and executing a creating processing in which: in a case where the number of the characters of the first URL is less than the threshold value, the information processing apparatus creates a first two-dimensional code storing the first URL; and in a case where the number of the characters of the first URL is greater than or equal to the threshold value, the information processing apparatus creates a second two-dimensional code storing a second URL associated with the first URL and having less characters than the first URL.

13 Claims, 8 Drawing Sheets

(51) Int. Cl.
    *G06F 16/957*     (2019.01)
    *G06K 19/06*     (2006.01)

(56)     References Cited

U.S. PATENT DOCUMENTS

| | | | |
|---|---|---|---|
| 2013/0026239 A1* | 1/2013 | Sakahashi | G06K 19/06037 235/494 |
| 2013/0026241 A1* | 1/2013 | Sakahashi | G06K 19/06037 235/494 |
| 2013/0240627 A1* | 9/2013 | Mamaladze | G06K 7/1456 235/462.09 |
| 2014/0112551 A1* | 4/2014 | Terwilliger | G06K 9/00 382/118 |
| 2014/0115708 A1* | 4/2014 | Terwilliger | G06F 21/36 726/26 |
| 2016/0196484 A1* | 7/2016 | Ciavatta | G06K 19/06037 235/462.1 |
| 2016/0224680 A1* | 8/2016 | Maynard, II | G06F 16/93 |
| 2017/0017869 A1* | 1/2017 | Jiang | G06F 16/9554 |

* cited by examiner

TAPE CONVEYING DIRECTION

| VERSION | NUMBER OF CHARACTERS | NUMBER OF CELLS |
|---|---|---|
| 1 | 14 | 21 |
| 2 | 26 | 25 |
| 3 | 42 | 29 |

NON-TRANSITORY STORAGE MEDIUM STORING INSTRUCTIONS READABLE BY INFORMATION PROCESSING APPARATUS, AND TWO-DIMENSIONAL-CODE CREATING SYSTEM

CROSS REFERENCE TO RELATED APPLICATION

The present application claims priority from Japanese Patent Application No. 2017-212414, which was filed on Nov. 2, 2017, the disclosure of which is herein incorporated by reference in its entirety.

BACKGROUND

The following disclosure relates to a non-transitory storage medium storing a plurality of instructions readable by a computer of an information processing apparatus to create a two-dimensional code storing a uniform resource locator (URL) and to a two-dimensional-code creating system.

There is conventionally known a technique for storing a URL into a two-dimensional code. For example, there is known a configuration for creating, from a URL of a website, a short URL associated with the URL and shorter than the URL, and creating a QR code (registered trademark) storing the short URL.

SUMMARY

In the case where a two-dimensional code is printed on a narrow sheet such as a label, the following problem arises. That is, the size of the two-dimensional code typified by the QR code tends to increase with increase in an amount of stored information. Thus, a two-dimensional code with a large number of characters contained in the URL cannot be printed appropriately in some cases.

The above-described conventional configuration creates a QR code storing a short URL that is made by shortening an original URL. In the case where the short URL is stored, the size of the two-dimensional code is smaller than in the case where the original URL is stored. This increases the possibility that the two-dimensional code is printable on the sheet. However, a redirecting processing from the short URL to the original URL is required. Accordingly, there is room for improvements in the technique for creating the two-dimensional code on the precondition that the two-dimensional code is to be printed.

Accordingly, an aspect of the disclosure relates to a technique for creating a two-dimensional code of an appropriate size when creating a two-dimensional code storing a URL.

One aspect of the disclosure relates to a non-transitory storage medium storing a plurality of instructions readable by a computer of an information processing apparatus. The information processing apparatus includes a communication interface connectable to a printer. When executed by the computer, the plurality of instructions cause the information processing apparatus to perform: executing an obtaining processing in which the information processing apparatus obtains a URL (uniform resource locator); executing a determining processing in which the information processing apparatus determines whether the number of characters of a first URL that is the URL obtained in the obtaining processing is less than a threshold value; and executing a creating processing in which: in a case where the information processing apparatus in the determining processing determines that the number of the characters of the first URL is less than the threshold value, the information processing apparatus creates a first two-dimensional code storing the first URL; and in a case where the information processing apparatus in the determining processing determines that the number of the characters of the first URL is greater than or equal to the threshold value, the information processing apparatus creates a second two-dimensional code storing a second URL which is associated with the first URL and of which the number of characters is less than the number of the characters of the first URL.

Another aspect of the disclosure relates to a two-dimensional-code creating system including an information processing apparatus and a printer. The information processing apparatus includes a controller configured to perform: executing an obtaining processing in which the controller obtains a URL (uniform resource locator); executing a determining processing in which the controller determines whether the number of characters of a first URL that is the URL obtained in the obtaining processing is less than a threshold value; and executing a creating processing in which: in a case where the controller in the determining processing determines that the number of the characters of the first URL is less than the threshold value, the controller creates a first two-dimensional code storing the first URL; and in a case where the controller in the determining processing determines that the number of the characters of the first URL is greater than or equal to the threshold value, the controller creates a second two-dimensional code storing a second URL which is associated with the first URL and of which the number of characters is less than the number of the characters of the first URL. The printer includes a printing device configured to print, on a printing medium, an image storing the two-dimensional code created in the creating processing.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment of the present disclosure by reference to the drawings. A two-dimensional-code creating system according to the present embodiment includes an information processing apparatus and a printer communicable with each other.

Figure 1:
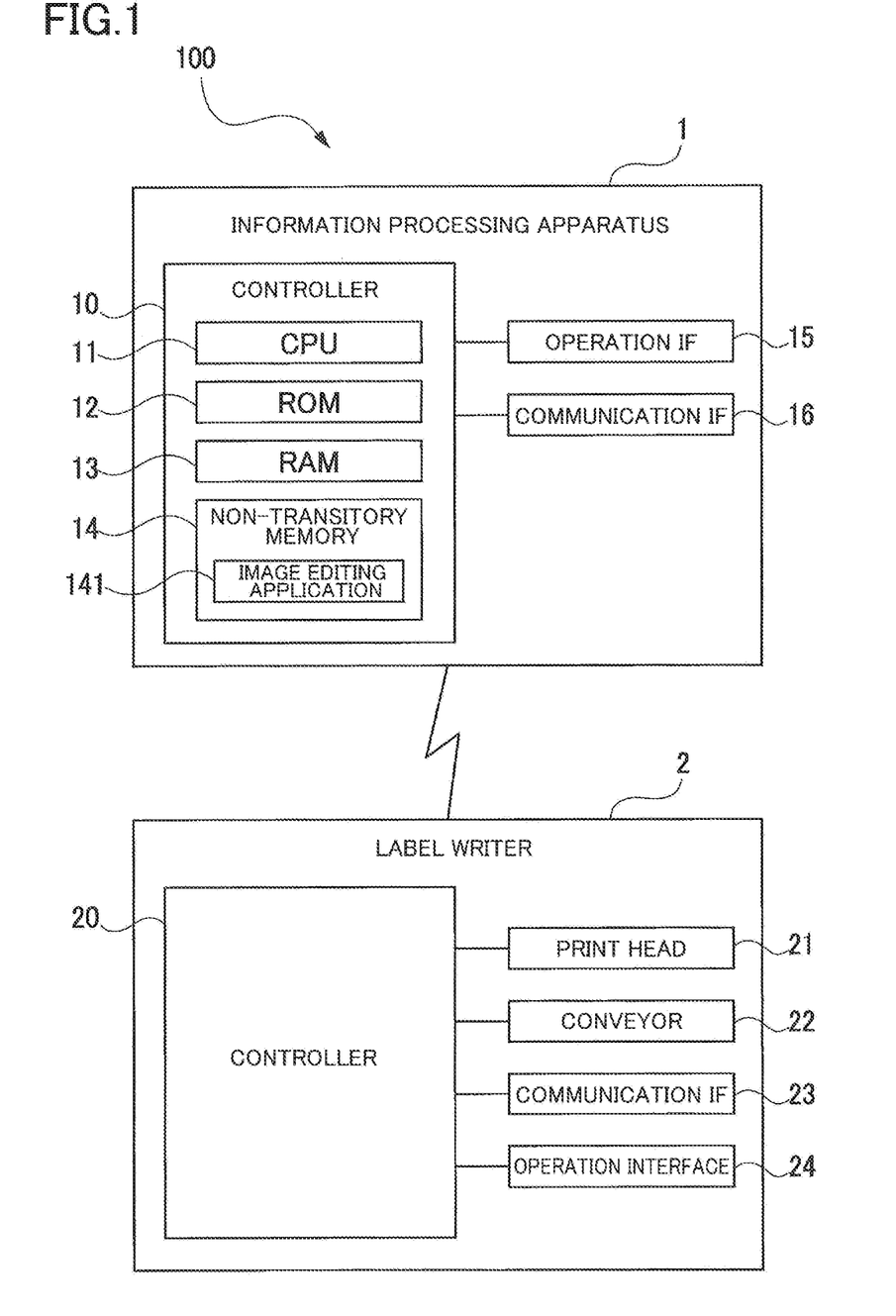
FIG. 1 is a schematic view of a two-dimensional-code creating system according to one embodiment.

As illustrated in FIG. 1, specifically, a two-dimensional-code creating system 100 includes an information processing apparatus 1 and a label writer 2 communicably connected to each other. The information processing apparatus 1 creates and edits image data, transmits the image data to the label writer 2, and instructs the label writer 2 to perform printing based on the image data, for example. Examples of the information processing apparatus 1 include a smartphone, a personal computer, and a tablet computer.

As illustrated in FIG. 1, the information processing apparatus 1 includes a controller 10 that includes a CPU 11, a ROM 12, a RAM 13, and a non-transitory memory (non-volatile memory) 14. The information processing apparatus 1 further includes an operation interface 15 and a communication interface 16 that are electrically connected to the controller 10.

The ROM 12 stores a startup program for starting up the information processing apparatus 1, for example. The RAM 13 is used as a working area when various processings are executed or as a storage area to which data is temporarily stored. The non-transitory memory 14 is, for example, a hard disk drive or a flash memory and stores various programs and data. The CPU 11 executes various processings according to the program or programs read from the ROM 12 or the non-transitory memory 14.

In the present embodiment, the non-transitory memory 14 stores an image editing application 141 that is an application program for editing an image and causing the label writer 2 to perform printing based on the edited image. The image editing application 141 is one example of a two-dimensional-code creating program. The CPU 11 executes processings according to the image editing application 141 in response to an instruction given by a user. In the following description, the wordings "the CPU 11 executes a processing according to the image editing application 141" may be hereinafter referred to as "the image editing application 141 executes a processing" for simplicity.

The operation interface 15 is, for example, a touch screen that accepts an input from the user and displays information. The information processing apparatus 1 may include a keyboard, a mouse, a display, and other similar devices instead of the operation interface 15. The communication interface 16 includes hardware for communication with the label writer 2. Various communication standards may be used such as a USB and a LAN. Also, the communication may be performed wirelessly or wiredly.

In the present embodiment, the label writer 2 is a device configured to produce a label by thermal-transfer printing on a print tape that is a continuous strip-shaped printing medium. The label writer 2 is one example of a printer. It is noted that the printer is not limited to the label writer. The printing method is not limited to the thermal-transfer method and may be any of an ink-jet method, an electronic-photographic method, and a thermal method, for example. The printing medium is not limited to the print tape and may be any of a plain paper sheet, a postcard, and a card, for example. The printing medium may have any size and may be formed of any material.

As illustrated in FIG. 1, the label writer 2 includes a controller 20, a print head 21, a conveyor 22, a communication interface 23, and an operation interface 24. The controller 20 includes a CPU and a memory and controls devices of the label writer 2. It is noted that each of the controller 10 and the controller 20 in FIG. 1 is not limited to a single element (hardware) actually provided and may be constituted by a plurality of elements (hardware) used for controlling a corresponding one of the information processing apparatus 1 and the label writer 2.

The print head 21 prints an image on the print tape. The conveyor 22 conveys the print tape as the printing medium. The communication interface 23 includes hardware for communication with the information processing apparatus 1. The operation interface 24 is, for example, a touch screen that accepts an input from the user and displays information. It is noted that the label writer 2 may further include a camera and a configuration for cutting the print tape, for example. The operation interface 24 may be removed.

In the present embodiment, the image editing application 141 edits an image to be printed by the label writer 2, based on an instruction given by the user. The image editing application 141 accepts an instruction for adding characters, figures, and/or a two-dimensional code to the image being edited, for example.

The two-dimensional code represents information by means of a plurality of cells arranged in a rectangular region of the two-dimensional code. Examples of the two-dimensional code include a QR code, a Data Matrix, and PDF417. Each of the cells in the rectangular region indicates ON or OFF. The two-dimensional code stores information by means of arrangement of the cells. An amount of information storable in the two-dimensional code increases with increase in the number of the cells. In the case where the cells have the same size, a region in which the two-dimensional code is printed increases in the vertical direction or the lateral direction with increase in the number of the cells. That is, the two-dimensional code tends to increase with increase in the amount of stored information.

There will be described a case where the user operates the image editing application 141 to instruct the label writer 2 to print an image including a QR code storing a URL representing address information on a website, for example. When the image editing application 141 is started up in the information processing apparatus 1, as illustrated in FIG. 2, an edit screen is displayed on the operation interface 15, for example.

Figure 2A:
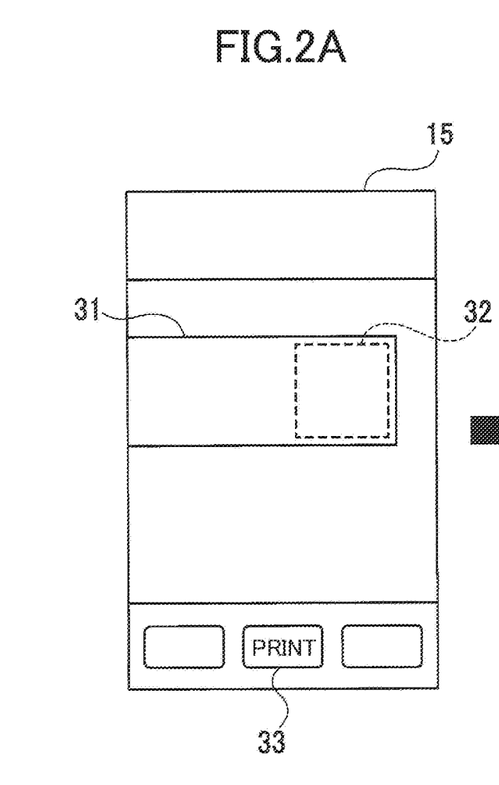
FIGS. 2A through 2C are views illustrating an example of an edit screen.

When instructed to add the QR code, the image editing application 141 controls the edit screen to display a region to which the QR code is to be added. As illustrated in FIG. 2A, the edit screen, for example, displays (i) an outer-shape line 31 indicating the shape of a print tape T that is a printing medium used in the label writer 2, and (ii) a line indicating a print region 32 set in the region enclosed by the outer-shape line 31. The print region 32 indicates a region on which the QR code is to be printed. In the example in FIG. 2A, the edit screen contains a print button 33. It is noted that the position and the size of the region to which the QR code is added may be determined by instruction given by the user and may be automatically determined by the image editing application 141 based on the width of the print tape T, for example. In the case where a template containing the QR code is used, for example, the position and the size of the region to which the QR code is added may be determined based on the template.

Figure 2B:
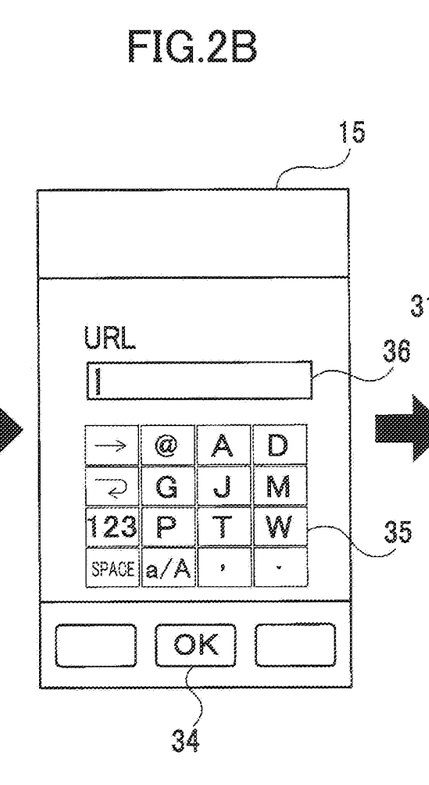

When the print region 32 contained in the edit screen is touched, for example, the image editing application 141 starts accepting designation of a URL to be stored into the QR code. As illustrated in FIG. 2B, the image editing application 141 controls the edit screen to display a keyboard 35 and an input box 36 for accepting an input of the URL, for example It is noted that an OK button 34 is displayed in FIG. 2B instead of the print button 33.

When the OK button 34 is touched, the image editing application 141 determines whether a URL obtained based on designation of the user is storable in a QR code that is printable entirely within the print region 32 by the label writer 2. A URL with the large number of characters is data having a larger amount of information than a URL with the small number of characters. The QR code storing the URL with the large number of characters tends to be larger in size than the QR code storing the URL with the small number of characters. In the present embodiment, the label writer 2 has an upper limit to the number of dots printable on the tape in its widthwise direction due to the width (tape width) of the print tape T as the printing medium and the configuration of the print head 21, for example. That is, there is a possibility that the label writer 2 in the present embodiment is unable to print the QR code storing the URL with the large number of characters. The determination of whether the URL is storable will be described later in detail.

Figure 2C:
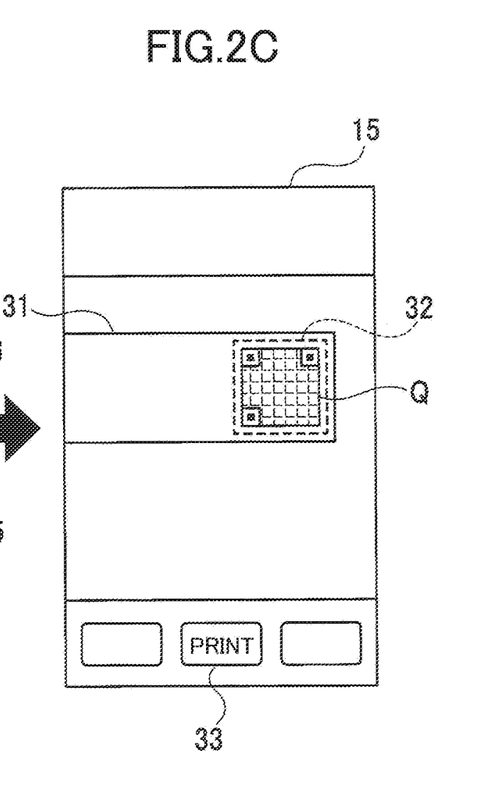

When the image editing application 141 determines that the URL is storable, the image editing application 141 creates a QR code storing the obtained URL. As illustrated in FIG. 2C, for example, a created QR code Q is displayed within the print region 32 on the edit screen. The print button 33 is displayed again in FIG. 2C.

When the image editing application 141 determines that the URL is not storable, the image editing application 141 obtains a shortened URL based on the obtained URL. The shortened URL is a URL associated with an original URL as the obtained URL, and the number of characters of the shortened URL is less than that of the obtained URL. The image editing application 141 creates a QR code storing the shortened URL. As illustrated in FIG. 2C, for example, a QR code Q storing the shortened URL is displayed within the print region 32 on the edit screen.

The image editing application 141 may have a means for creating the shortened URL and may obtain the shortened URL using already available service. In service provided by Google (registered trademark), for example, the original URL is stored into a server managed by Google, and the shortened URL having about 21 characters is provided as address information on a storage location. The original URL and the shortened URL are stored in the server managed by Google so as to be associated with each other. When the shortened URL is referred, a redirection is performed to the original URL by the server of Google to display a web page associated with the original URL.

When the print button 33 is thereafter touched, the image editing application 141 creates image data for printing based on the image being edited and transmits the created image data to the label writer 2. The label writer 2 performs printing based on the received image data. As a result, a label on which the QR code Q is printed is created.

There will be described the determination of whether the URL is storable in the QR code of the printable size. The image editing application 141 determines whether the number of characters of the URL designated by the user is equal to the number of characters storable in the QR code that is printable entirely within the print region 32 by the label writer 2.

Figure 3:
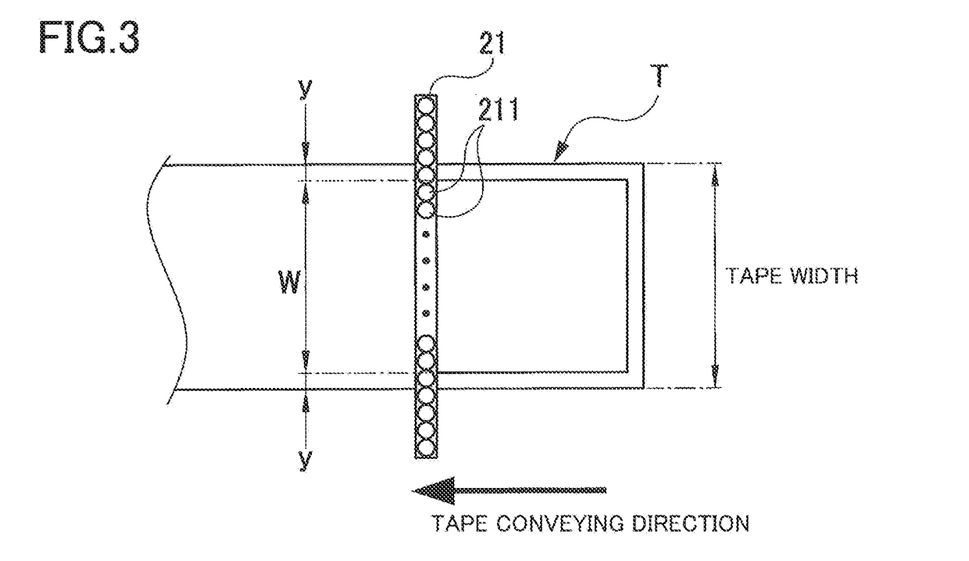
FIG. 3 is a view illustrating an example of a positional relationship between a print tape and a print head.

The number of dots printable by the label writer 2 will be described first. In the present embodiment, as illustrated in FIG. 3, the print head 21 of the label writer 2 includes a plurality of print pins 211 as heating elements. The label writer 2 performs printing by heating the print pins 211 of the print head 21 while conveying the print tape T in one direction. The print pins 211 are arranged in a row in a direction orthogonal to the direction in which the print tape T is conveyed. That is, the print pins 211 are arranged in a row in the widthwise direction of the print tape T being conveyed. The controller 20 controls the print pins 211 to be heated individually.

The label writer 2 is capable of performing printing on any of the print tapes T having different widths. The conveyor 22 of the label writer 2 conveys the print tapes T of various kinds such that the center of each of the print tapes T in the widthwise direction passes through a position opposed to the center of the print head 21. The print pins 211 are arranged with the same pitch over a region that is wider or equal to the print tape T having the largest width among the print tapes T usable in the label writer 2. The pitch of the print pins 211 is a fixed distance that is determined in accordance with the model of the label writer 2.

In the present embodiment, the label writer 2 does not perform printing on opposite end portions of the print tape T in the widthwise direction. As illustrated in FIG. 3, margins y are provided at the respective opposite end portions of the print tape T in the widthwise direction. A printable width W except for the widths of the respective margins y is determined in accordance with the model of the label writer 2 and the width of the print tape T. In the same model, the printable width W increases with increase in the width of the print tape T.

The printable region has a high degree of flexibility in the longitudinal direction since the printing medium is the print tape T. The conveyor 22 of the label writer 2 conveys the print tape T in conjunction with operations of the print head 21 such that the pitch of printing in the longitudinal direction is equal to that in the widthwise direction. In the case where a margin is provided in the longitudinal direction, the conveyor 22 conveys the print tape T without operating the print head 21. FIG. 3 illustrates an example of a case in which the print tape T is cut in a state in which a margin having about the same size as that of the margin y is provided at a rear end of the printed region.

The QR code is a square two-dimensional code. The print region 32 on which the QR code is to be printed is also a square region. The number of print dots D printable along one side of the print region 32 is calculated based on the pitch of the print pins 211 and the length of one side of the print region 32. The number of dots D printable along one side of the print region 32 increases with decrease in the pitch of the print pins 211, i.e., with increase in print resolution. Also, the number of dots D printable along one side of the print region 32 increases with increase in the size of the print region 32. Since the label writer 2 can perform printing only up to the printable width W in the widthwise direction of the print tape T, the length of one side of the print region 32 which is settable for the print tape T is up to the printable width W.

For example, the printable width W is 9 mm in the case where the label writer 2 includes the print head 21 with a print resolution of 180 dpi, and each of the margins y provided at opposite end portions of a tape having a width of 12 mm has 1.5 mm in the widthwise direction. The number of dots D printable in the widthwise direction by the label writer 2 on the tape having the width of 12 mm is 63 dots at most according to the following expression: $D=9 \times 180/25.4=63.8$.

Figure 4:
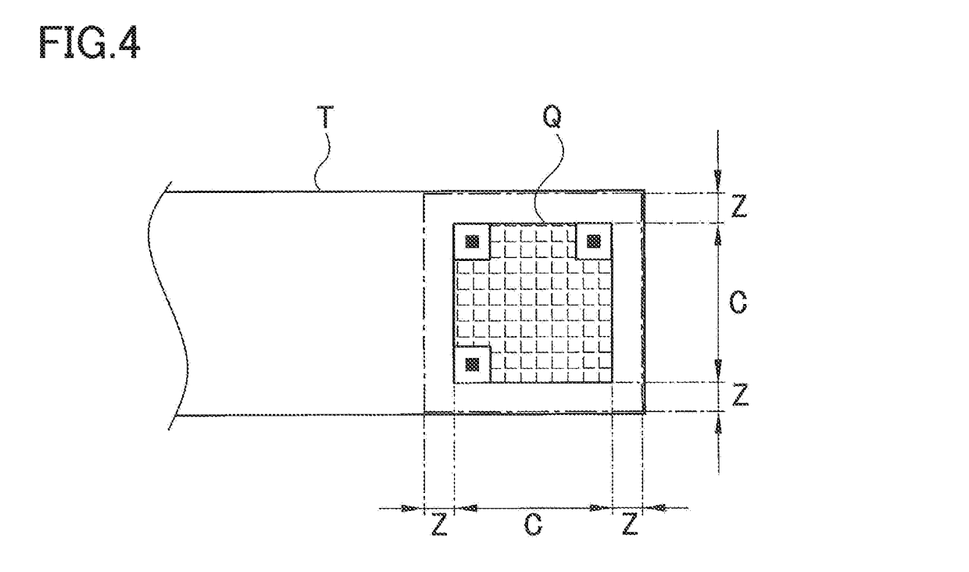
FIG. 4 is a view illustrating an example of a state in which a QR code is printed on a print tape.

There will be next described the QR code. For example, as illustrated in FIG. 4, the QR code Q is a square two-dimensional code and stores information by means of cells arranged within a region except various patterns for positional detection such as finder patterns arranged at corner portions. The QR code has various versions with different numbers of cells C per side. The version with a large number of the cells C defines a large QR code that can store a large amount of information. Predetermined blank zones Z needs to be provided around the QR code Q. The size of the blank zone Z on each side is defined as a size corresponding to four cells.

An amount of information storable in the QR code is different depending upon the version of the QR code, an error correction level, and the type of data. The number of cells of the QR code is different depending upon the version of the QR code. Even in the case of the same version, the storable amount of information is different depending upon the error correction level and the type of data to be stored. The error correction level is an amount of Reed-Solomon codes to be added to a data region of the QR code. The QR code is provided with four error correction levels L, M, Q, H in the order from the lowest level. In the same version of the QR code, the higher the error correction level, the smaller the storable amount of information is. Numbers, alphanumeric characters, binaries, and Chinese characters are prepared for the types of data. The URL is binary data.

Figure 5:
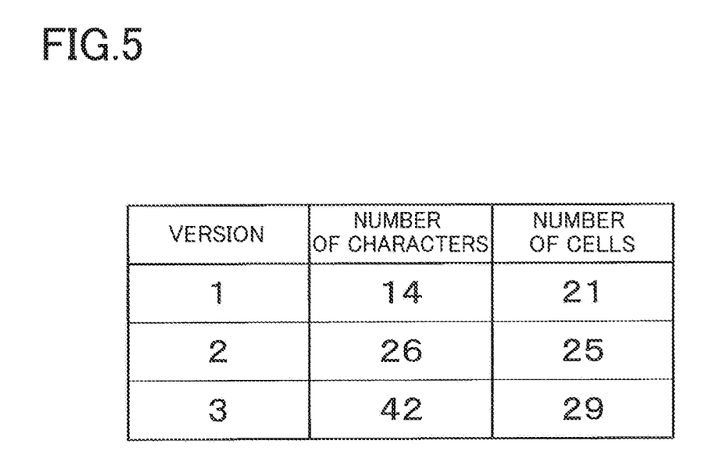
FIG. 5 is a view illustrating a relationship among a version, the number of characters, and the number of cells.

In the case where the URL is stored into the QR code, it is possible to determine the lowest possible version based on the number of characters of the URL and the error correction level. FIG. 5 represents a relationship among the version, the number of characters of the URL, and the number of the cells C per side, in the case where the level M as the common error correction level is employed. According to this table, a URL having characters less than or equal to 14 characters is storable into the QR code in version 1, for example. The number of the cells C per side in the QR code in version 1 is twenty one.

When reading a printed QR code, it is required to obtain arrangement of the cells by a reading device such as a scanner and a camera. To prevent a reading error due to incomplete printing such as fading, the label writer 2 prints one cell at a size larger than one dot and larger than or equal to four dots constituted by two dots in the vertical direction and two dots in the lateral direction. To print the QR code Q having the number of the cells C per side in the case where the label writer 2 prints each cell using four dots, for example, the number of dots D printable along one side of the print region 32 needs to be at least greater than or equal to twice the number of the cells C (D □ C×2, and the blank zone Z of a size corresponding to eight cells needs to be provided for each side. It is noted that each of the blank zones Z may contain a corresponding one of the margins y.

In the present embodiment, in the case where the information processing apparatus 1 is instructed via the image editing application 141 to add the QR code storing the URL to the image being edited, the information processing apparatus 1 determines whether the number of characters of the URL to be stored is less than a threshold value. When the number of characters of the URL to be stored is less than the threshold value, the information processing apparatus 1 determines that the QR code is printable. Specifically, when the number of characters of the URL to be stored is less than or equal to the number of characters storable in the QR code printable within the print region 32, the information processing apparatus 1 determines that the QR code is printable. In this case, the threshold value is greater than the number of characters storable in the QR code printable within the print region 32 and is less than or equal to the number obtained by adding one to the number of the storable characters. The number obtained by adding one to the number of characters storable in the QR code printable within the print region 32 is one example of the threshold value.

The threshold value is, for example, a variable value that increases with increase in the number of the cells C determined by the version of the printable QR code. The threshold value increases with increase in size of the print region 32 on which the QR code is to be printed. In the case where the number of dots for one cell is fixed, the threshold value increases with increase in the number of dots printable within a unit distance. Since the width of the print tape T determines an upper limit to the length of one side of the print region 32 in the label writer 2, the threshold value increases with increase in the tape width.

The threshold value may be a fixed value. For example, in the case where the label writer 2 is configured to print a QR code only in a particular version, the number of storable characters is a fixed value equal to the number of characters storable in cells C in the particular version. For example, the image editing application 141 may store fixed threshold values for the models of the label writer 2 and the widths of the print tapes T, and read and use one of the stored value.

Figure 6:
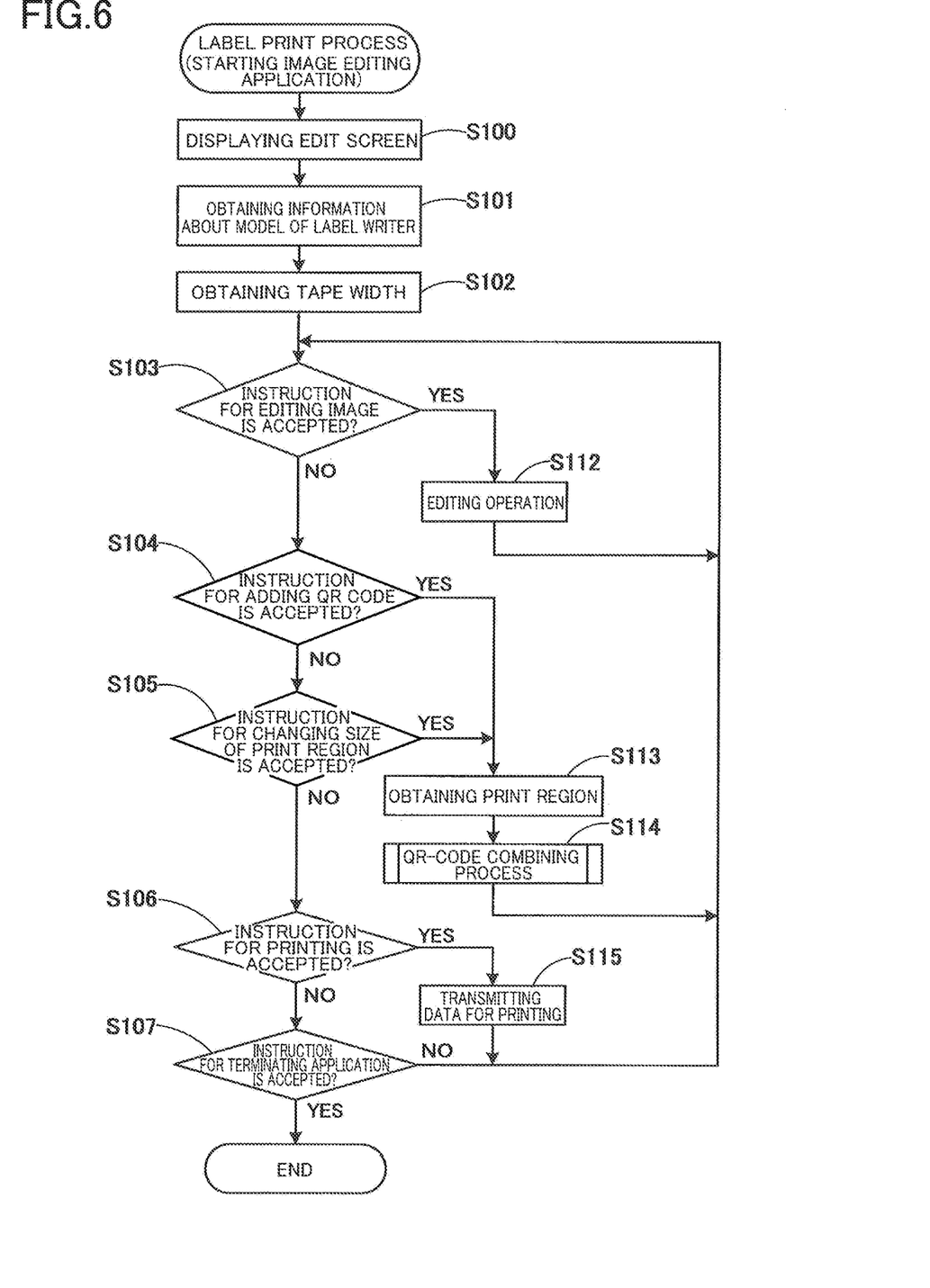
FIG. 6 is a flowchart representing a procedure of a label print process.

There will be next described, with reference to the flowchart in FIG. 6, a procedure of a label print process that is executed by the information processing apparatus 1 to perform the above-described two-dimensional-code creating operation in the two-dimensional-code creating system 100 according to the present embodiment. When the image editing application 141 is started up, the label print process is executed by the CPU 11 of the information processing apparatus 1. That is, the label print process, and a QR-code combining process and a shortening determining process, which will be described below, are contained in the image editing application 141.

The label print process begins with S100 at which the CPU 11 controls the operation interface 15 to display the edit screen illustrated in FIG. 2A, for example. The CPU 11 at S101 obtains information about the model of the label writer 2 being connected. The information about the model includes information about the pitch of the print pins 211 of the print head 21, for example. The processing at S101 is one example of a number-of-printable-dots obtaining processing. The CPU 11 at S102 obtains information about the width of the print tape T as the printing medium. The processing at S102 is one example of a printing-medium-width obtaining processing.

The CPU 11 may obtain the information about the model and the information about the tape width by communicating with the label writer 2 via the communication interface 16. In the case where the image editing application 141 stores the information, the CPU 11 reads the stored information. In the case where the label writer 2 is not connected when the image editing application 141 is started up or in the case where the printer is not selected, the CPU 11 accepts selection of the printer before the processing at S101.

In the label print process, the CPU 11 accepts various instructions from the user. The CPU 11 at S103 determines whether an instruction for editing the image is accepted. When the CPU 11 determines that the instruction for editing the image is not accepted (S103: NO), the CPU 11 at S104 determines whether an instruction for adding the QR code to the image being edited is accepted. When the CPU 11 determines that the instruction for adding the QR code to the image being edited is not accepted (S104: NO), the CPU 11 at S105 determines whether an instruction for changing the size of the print region 32 as the region to which the QR code is to be added is accepted.

When the CPU 11 determines that the instruction for changing the size of the print region 32 is not accepted (S105: NO), the CPU 11 at S106 determines whether an instruction for execution of printing is accepted. When the CPU 11 determines that the instruction for execution of printing is not accepted (S106: NO), the CPU 11 at S107 determines whether an instruction for terminating the application is accepted. When the CPU 11 determines that the instruction for terminating the application is not accepted (S107: NO), this flow returns to S103 to repeat the processings at S103-S107. It is noted that the order of the processings at S103-S107 is not limited to this order and may be a different order. The processings at S103-S107 may be executed in parallel. Also, another or other instructions may be accepted.

When the CPU 11 determines that the instruction for editing the image is accepted (S103: YES), the CPU 11 at S112 executes an editing operation based on the instruction given by the user. The editing operation includes an edit of the image and a change in the edit screen. After the processing at S112, this flow returns to S103 to repeat the processings at S103-S107.

When the CPU 11 determines that the instruction for adding the QR code to the image being edited is accepted (S104: YES), or when the CPU 11 determines that the instruction for changing the size of the print region 32 as the region to which the QR code is to be added is accepted (S105: YES), the CPU 11 obtains the print region 32 at S113. The processing at S113 is one example of a two-dimensional-code-region obtaining processing. The print region 32 is one example of a two-dimensional-code region. The instruction for adding the QR code includes settings of the position and the size of the print region 32 to which the QR code is to be added. The instruction for changing the size of the print region 32 to which the QR code is to be added includes a setting of the size of the print region 32 after the change.

It is noted that the image editing application 141 may not accept an instruction for changing the size of the print region 32 to a size less than a predetermined size. Alternatively, in the case where the instruction for changing the size of the print region 32 to the size less than the predetermined size is accepted, the image editing application 141 may display a warning before the change. If the printed QR code is too small, usability may be deteriorated. For example, some applications installed in a smartphone by default do not support reading of a QR code smaller than a predetermined size. Hence, with the above-described configuration, since the user intending to change the size of the print region 32 to a size less than the predetermined size is prompted to rethink, it is possible to increase the usability of the QR code.

The CPU 11 executes the QR-code combining process at S114. In the QR-code combining process, the CPU 11 determines whether the QR code can be added to the print region 32, and then creates a QR code that can be added to the print region 32. Even after the QR code is once added in the QR-code combining process, when the size of the print region 32 is changed, the size of the insertable QR code changes. Hence, also in the case where the CPU 11 determines that the size of the print region 32 is changed, the CPU 11 executes the QR-code combining process again.

Figure 7:
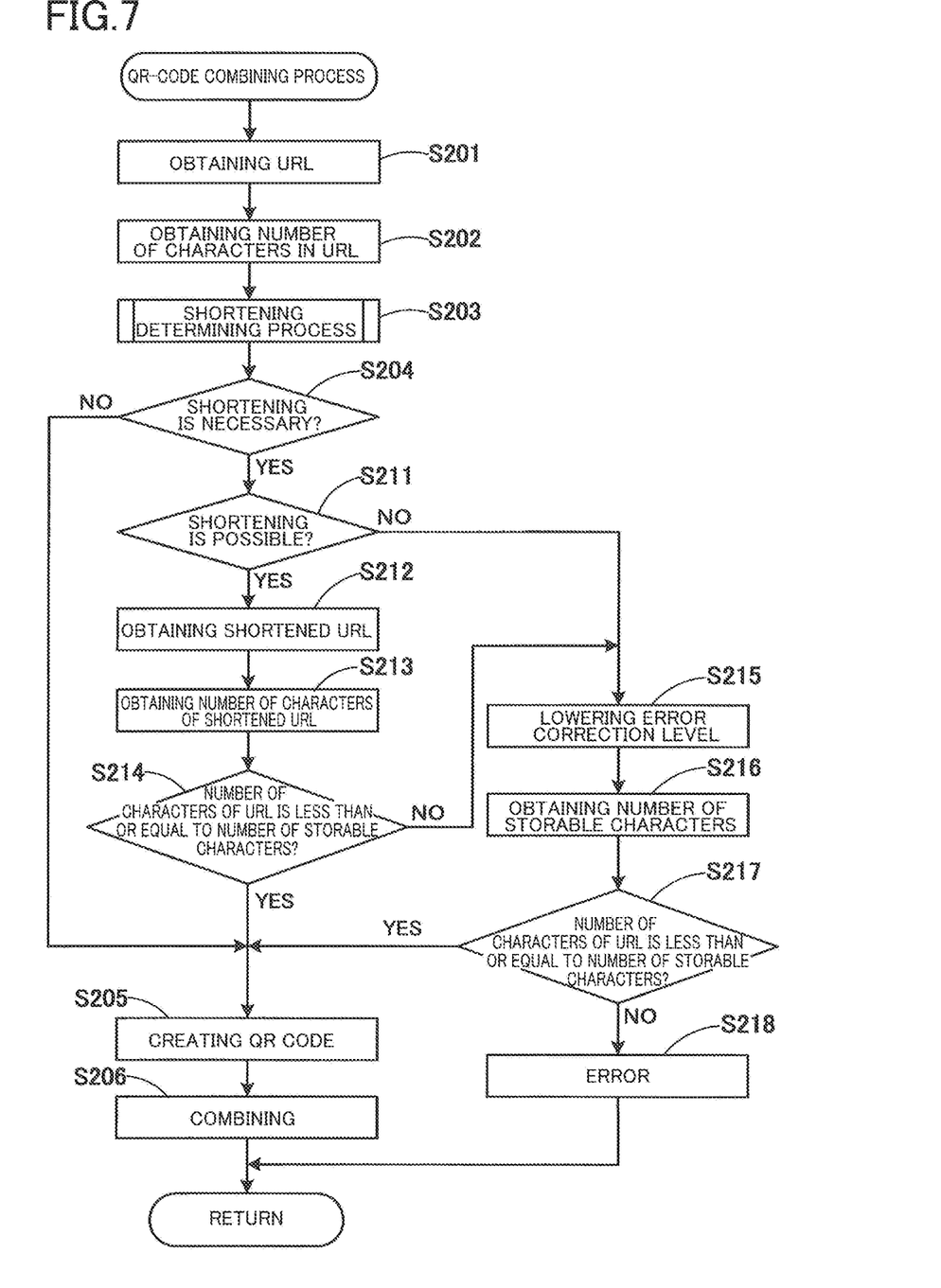
FIG. 7 is a flowchart representing a procedure of a QR-code combining process.

There will be next described a procedure of the QR-code combining process with reference to the flowchart in FIG. 7. The QR-code combining process begins with S201 at which the CPU 11 obtains an URL to be stored into the QR code to be added. The processing at S201 is one example of an obtaining processing. The URL obtained at S201 is one example of a first URL. The CPU 11 may obtain the URL by instructing the user to input the URL as illustrated in FIG. 2B and may obtain the URL from a website selected by the user, for example. The CPU 11 at S202 obtains the number of characters of the obtained URL. The CPU 11 at S203 executes the shortening determining process to determine whether shortening of the URL is required.

There will be described a procedure of the shortening determining process with reference to the flowchart in FIG. 8. The shortening determining process begins with S301 at which the CPU 11 calculates the number of dots D printable along one side of the print region 32, based on the information about the model of the label writer 2 obtained at S101 in the label print process, the information about the tape width obtained at S102, and the information about the print region 32 obtained at S113.

The CPU 11 obtains, from the model information, the information about the pitch of the print pins 211 of the print head 21 of the label writer 2 and information about margins for each tape width. Based on the obtained information, the information about the tape width, and the print region 32, the CPU 11 obtains the number of dots D printable on the print region 32 along one side. In the case where the set print region 32 is not square, the CPU 11 obtains the number of dots D printable on a shorter one of the sides of the print region 32. In the case where setting of the print region 32 by the user is not accepted, the CPU 11 obtains the number of dots D arrangeable in a region having the printable width W (see FIG. 3) corresponding to the tape width. It is noted that the model information may contain information about the number of dots D arrangeable in the printable width W for each tape width, and in this case the CPU 11 may obtain the number of dots D based on the model information.

The CPU 11 at S302 obtains the largest number of the cells C printable by the number of dots D. In the label writer 2, there is a case where the length of each of the margins y in the widthwise direction of the print tape T corresponds to the width of a corresponding one of the blank zones Z of the QR code, depending upon the tape width and the size of one cell. In the case where one cell is printed by four dots, the largest number of the cells C along one side is, for example, calculated by the following expression: $C=D/2$. In the case where each of the margins y is small, the CPU 12 calculates the largest number of the cells C that can be arranged in a region after securing the blank zones Z.

The CPU 11 at S303 determines the version of the QR code based on the obtained number of the cells C. The CPU 11 at S304 obtains the number of characters storable in the QR code in the determined version. For example, in the case where a QR code is to be printed on the print region 32 having 8 mm per side by the label writer 2 with 180 dpi, the number of dots D is 56, and the CPU 11 determines, based on the relationship illustrated in FIG. 5, the version of the QR code to version 2 with 25 cells C per side. The number of characters storable in the QR code in version 2 is 26 characters.

The CPU 11 at S305 determines whether the number of characters of the URL which is obtained at S202 in the QR-code combining process is less than or equal to the number of storable characters which is obtained at S304. The processing at S305 is one example of a determining processing.

When the CPU 11 determines whether the number of characters of the URL is less than or equal to the number of storable characters (S305: YES), the CPU 11 at S306 determines that shortening is not necessary. When the CPU 11 determines that the number of characters of the URL is greater than the number of storable characters (S305: NO), the CPU 11 at S307 determines that shortening is necessary. After the processing at S306 or S307, the shortening determining process ends, and this flow returns to the QR-code combining process.

The number of characters of the URL storable in the QR code printable within the print region 32 increases with increase in the size of the print region 32, increases with increase in the number of dots printable within a unit distance by the printer, and increases with increase in the width of the print tape T to be printed. That is, it is possible to increase the possibility of creation of the QR code storing the original URL, by determining whether the number of characters of the URL to be stored is less than the threshold value, using the threshold value that increases with increase in the number of storable characters.

Returning to the explanation for the QR-code combining process, the CPU 11 at S204 determines whether the CPU 11 at S203 in the shortening determining process determines that shortening is necessary. When the CPU 11 determines that shortening of the URL is not necessary (S204: NO), the CPU 11 at S205 creates, based on the URL obtained at S201, a QR code in the version determined at S303 in the shortening determining process. The processing at S205 is one example of a creating processing. The QR code created at S205 is one example of a first two-dimensional code. The CPU 11 at S206 combines the created QR code with the image being edited. Upon the completion of the processing at S206, the QR-code combining process ends, and this flow returns to the label print process. The processing at S206 is one example of a combining processing.

When the CPU 11 determines that shortening is necessary (S204: YES), the CPU 11 at S211 determines whether shortening can be performed. In the present embodiment, since the service for creating the shortened URL is used, there are URLs that cannot be shortened due to the specification of the service to be used. For example, some services do not accept shortening of URLs having already been shortened and URLs having a domain name referring to a particular file type. If a new shortened URL is created based on a URL having already been shortened, a relationship between the new shortened URL and the original URL is complicated. In the case where a URL is an address indicating a file such as an executable file or a compressed file, the shortened URL cannot be created in some cases.

When the CPU 11 determines that shortening of the URL can be performed (S211: YES), the CPU 11 at S212 obtains the shortened URL corresponding to the URL obtained at S201. The CPU 11 accesses to an external server providing the service for creating the shortened URL and requests the external server to create the shortened URL, for example. The CPU 11 then obtains the shortened URL created by the external server. The shortened URL obtained at S212 is one example of a second URL.

The CPU 11 at S213 obtains the number of characters of the obtained shortened URL. As in the processing at S305 in the shortening determining process, the CPU 11 at S214 determines whether the number of characters of the obtained shortened URL is less than or equal to the number of storable characters. When the CPU 11 determines that the number of characters of the shortened URL is less than or equal to the number of storable characters (S214: YES), the CPU 11 at S205 creates the QR code storing the shortened URL. The QR code created at S205 in this case is one example of a second two-dimensional code.

When the CPU 11 determines that shortening of the URL cannot be performed (S211: NO), or when the CPU 11 determines that the number of characters of the obtained shortened URL is not less than or equal to the number of storable characters (S214: NO), the CPU 11 lowers the error correction level at S215. The CPU 11 at S216 obtains the number of storable characters at the lowered error correction level.

According to the specification of the QR code, for example, the number of characters storable in the QR code in version 2 at the error correction level M is 26 characters. In the case of the error correction level L, the number of characters storable in the QR code in version 2 is 32 characters. That is, since the number of storable characters is increased by lowering the error correction level, the possibility that the QR code can be created is increased. The number obtained by adding one to the number of storable characters after lowering of the error correction level is one example of a low-level threshold value.

As in the processing at S305 in the shortening determining process, the CPU 11 at S217 determines whether the number of characters of the URL to be stored is less than or equal to the number of storable characters which is obtained at S216. When a negative decision (NO) is made at S211, the number of characters of the URL to be stored is the number of characters obtained at S202. When a negative decision (NO) is made at S214, the number of characters of the URL to be stored is the number of characters obtained at S213.

When the CPU 11 determines that the number of characters of the URL to be stored is less than or equal to the number of storable characters as a result of lowering of the error correction level (S217: YES), the CPU 11 at S205 stores the URL to be stored and creates the QR code with the lowered error correction level. The QR code created at S205 in this case is one example of a third two-dimensional code. The CPU 11 at S206 combines the created QR code with the image being edited. Upon the completion of the processing at S206, the QR-code combining process ends, and this flow returns to the label print process.

When the CPU 11 determines that the number of characters of the URL to be stored is not less than or equal to the number of storable characters even after lowering of the error correction level (S217: NO), the CPU 11 notifies an error at S218. Upon the completion of the processing at S218, the QR-code combining process ends, and this flow returns to the label print process. As the notification of the error, for example, the CPU 11 may control the operation interface 15 to display an error message and may make a voice message or vibrations. In the event of the error, the CPU 11 does not change the image being edited.

It is noted that, in the case where a negative decision (NO) is made at S214, that is, in the case where the URL cannot be stored even after the shortening, since the number of storable characters is increased by lowering the error correction level, there is a possibility that the original URL obtained at S202 becomes storable. In this case, the CPU 11 may store the original URL at S205 and create the QR code with the lowered error correction level.

Returning to the explanation for the label print process in FIG. 6, after the QR-code combining process at S114, this flow returns to S103 to repeat the processings at S103-S107.

When the CPU 11 determines that the instruction for execution of printing is accepted (S106: YES), the CPU 11 at S115 creates data for printing based on the image being edited and controls the communication interface 16 to transmit the created data to the label writer 2. The processing at S115 is one example of a print processing. The label writer 2 performs printing based on the received data for printing. After the processing at S115, this flow returns to S103 to repeat the processings at S103-S107. When the CPU 11 determines at S107 that the instruction for terminating the application is accepted (S107: YES), the label print process ends.

While it is assumed that the QR code is printed by the label writer 2 with 180 dpi in the above-described description, printers such as laser printers and ink-jet printers can perform printing with a higher print resolution. In this case, when one cell is printed by four dots, there is a possibility that each cell becomes too small. In the case where the sheet width and/or the print region 32 is large enough with respect to the print resolution, the number of dots for one cell is preferably increased to create the QR code that is easier to read. Some printers preferably determine the number of print dots constituting each cell, in accordance with the print resolution and/or the size of the print region 32.

Figure 8:
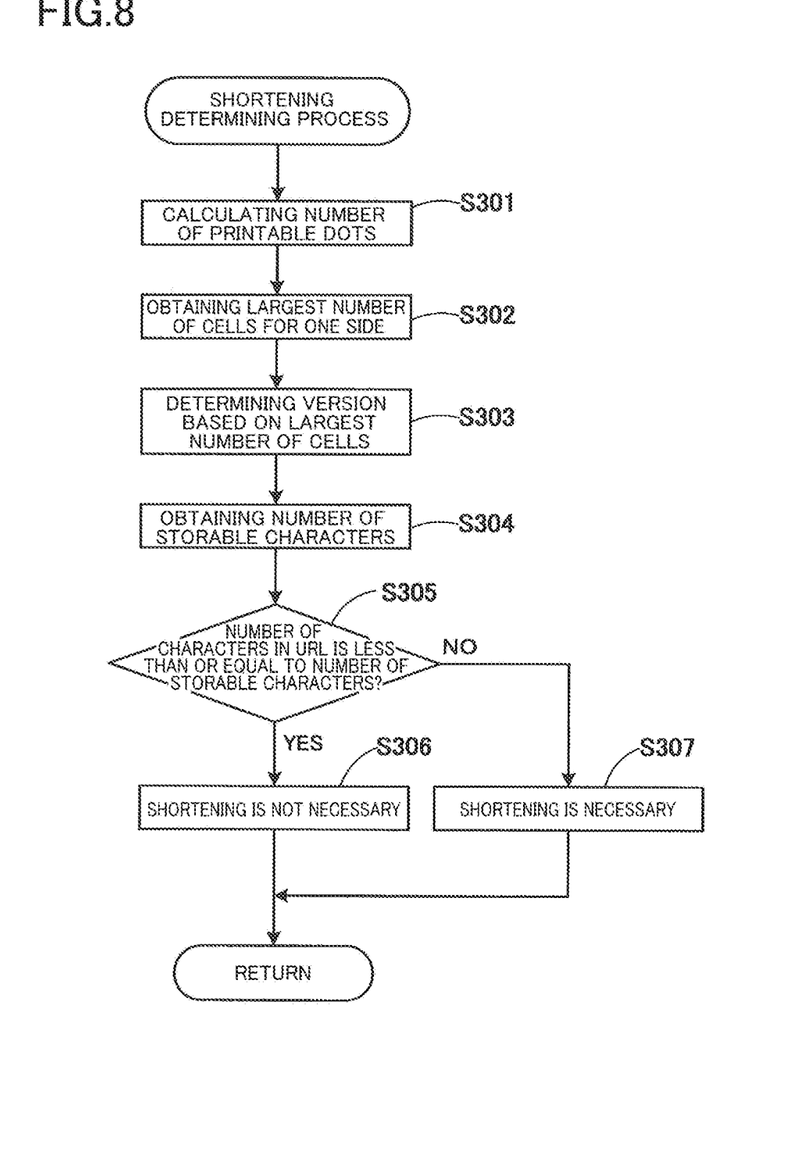
FIG. 8 is a flowchart representing a procedure of a shortening determining process.

When determining the number of print dots constituting each cell, the information processing apparatus 1 in the present embodiment executes a second shortening determining process instead of the shortening determining process illustrated in FIG. 8. The second shortening determining process is partly different from the shortening determining process illustrated in FIG. 8. There will be described a procedure of the second shortening determining process with reference to the flowchart in FIG. 9. It is noted that the same reference numerals and step numbers as used in the shortening determining process illustrated in FIG. 8 are used to designate the corresponding elements in the second shortening determining process in FIG. 9, and an explanation of which is dispensed with.

Figure 9:
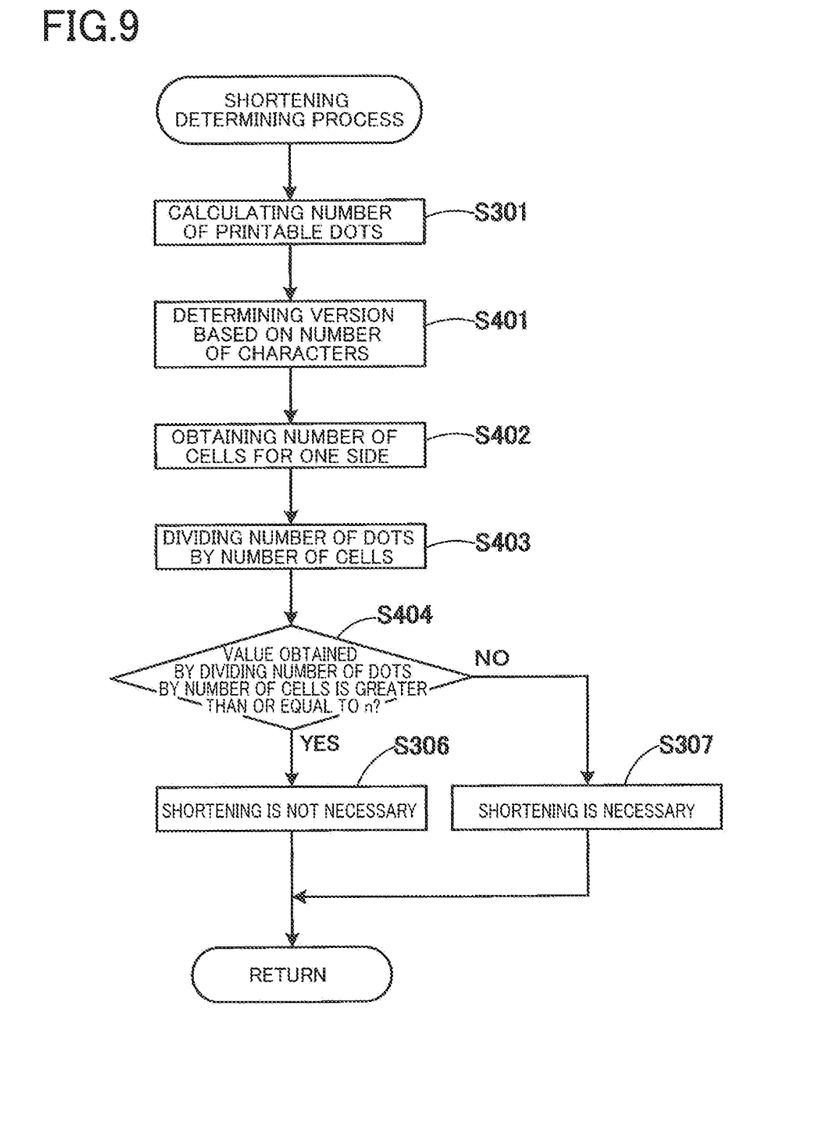
FIG. 9 is a flowchart representing a procedure of a shortening determining process.

Also in this shortening determining process, the CPU 11 at S301 calculates the number of dots D printable on the print region 32 for one side thereof. At S401, the CPU 11 determines, based on the relationship illustrated in FIG. 5, the version of the QR code into which information having an amount corresponding to the number of characters of the URL to be stored is storable. The CPU 11 selects the lowest version among versions in which the QR code is capable of storing information greater than or equal to the number of characters of the URL, for example. The CPU 11 at S402 obtains the number of cells of the QR code per side in the determined version. For example, in the case where the number of characters of the URL is 30 characters, the CPU 11 selects version 3 in which up to 42 characters are storable as illustrated in FIG. 5. The number of cells of the QR code per side in version 3 is twenty nine.

The CPU 11 at S403 calculates the largest number of dots constituting one side of one cell by dividing the number of dots calculated at S301 by the number of cells which is obtained by adding eight (i.e., the number of cells corresponding to the blank zones Z) to the number of cells obtained at S402. It is noted that, in the case where a two-dimensional code not having a square shape is to be printed or in the case where the print region 32 not having a square shape is set, the CPU 11 calculates the number of dots for one cell in each of the vertical direction and the lateral direction and selects a smaller one of the numbers.

The CPU 11 at S404 determines whether the number of dots along one side of one cell is greater than or equal to a particular value n. The value n is the smallest value of the number of dots along one side of one cell and is determined based on a relationship between a common reading resolution of reading devices and a common print resolution of printers. The value n increases with increase in the print resolution.

When the CPU 11 determines that the number of dots along one side of one cell is greater than or equal to the value n (S404: YES), the CPU 11 at S306 determines that shortening is not necessary. When the CPU 11 determines that the number of dots along one side of one cell is less than the value n (S404: NO), the CPU 11 at S307 determines that shortening is necessary. After the processing at S306 or S307, the shortening determining process ends, and this flow returns to the QR-code combining process.

Printers with a high print resolution allow the user to minutely set the number of dots constituting one cell and to select the number of cells printable within the print region 32 from a lot of numbers. Determining the number of dots for one cell based on the number of characters of the URL increases the possibility that a QR code appropriate for the print region 32 is created.

In the two-dimensional-code creating system 100 according to the present embodiment as described above, the CPU 11 determines whether the QR code storing the original URL obtained based on the instruction given by the user is printable, based on the number of dots D printable by the label writer 2 and the number of characters of the original URL. In the case where the number of characters of the original URL is small, the URL is storable into a QR code of a small size, which increases the possibility that the QR code is printable within the print region 32. Thus, creating the QR code storing the original URL eliminates the need of a redirecting processing. In the case where the number of characters of the original URL is not small, the size of a QR code capable of storing the URL is large, which increases the possibility that the QR code is not printable within the print region 32. Thus, obtaining the shortened URL having a smaller number of characters than the original URL and creating a QR code storing the shortened URL increase the possibility that the QR code is printable even on a narrow sheet such as a print tape. Thus, it is possible to create a QR code of an appropriate size by changing the URL to be stored into the QR code, based on the number of characters of the original URL.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, each of the information processing apparatus 1 and the label writer 2 constituting the two-dimensional-code creating system 100 is not limited to a single device, and a plurality of the information processing apparatuses 1 and a plurality of the label writers 2 may be provided. Each value in the above-described explanation is provided by way of example and may be a different value.

For example, the URL is not limited to the address information on the website and may be address information indicating storage location of an image, a photograph, or the like uploaded to a file server, an online storage, or a similar location.

While the image editing application 141 in the present embodiment accepts a print instruction, the present disclosure is applicable to an application that only creates a two-dimensional code without accepting a print instruction. For example, the present disclosure is applicable to a plug-in application that creates image data including a two-dimensional code such as a QR code and transmits the created image data to another application for printing.

The processing for lowering the error correction level may not be executed. For example, an error may be notified in the case where the shortened URL cannot be created or in the case where the number of characters of the created shortened URL is too large. In the case where the error correction level is designated by the user, the error correction level may not be lowered.

Conditions that the shortened URL cannot be created are not limited to those described above. For example, the shortened URL may be further shortened, and any file type may be permitted for shortening.

In the case where the number of dots constituting one cell is large in, e.g., printers with a high print resolution, even when the size of the print region 32 is changed, the determining processing and the creating processing may not be executed again. That is, the size of the print region 32 may be increased or reduced by merely changing the number of dots for one cell.

The processings in the above-described embodiment may be executed by hardware such as a single CPU, a plurality of CPUs, and an ASIC or combination thereof. Also, the processings in the above-described embodiment may be executed in various forms such as a non-transitory storage medium storing instructions for executing the processings and methods for executing the processings.

What is claimed is:

1. A non-transitory storage medium storing a plurality of instructions readable by a computer of an information processing apparatus, the information processing apparatus comprising a communication interface connectable to a printer,
    wherein when executed by the computer, the plurality of instructions cause the information processing apparatus to perform:
        executing an obtaining processing in which the information processing apparatus obtains a URL (uniform resource locator);
        executing a determining processing in which the information processing apparatus determines whether a number of characters of a first URL that is the URL obtained in the obtaining processing is less than a threshold value; and
        executing a creating processing in which:
            in a case where the information processing apparatus in the determining processing determines that the number of the characters of the first URL is less than the threshold value, the information processing apparatus creates a first two-dimensional code storing the first URL; and
            in a case where the information processing apparatus in the determining processing determines that the number of the characters of the first URL is greater than or equal to the threshold value, the information processing apparatus creates a second two-dimensional code storing a second URL which is associated with the first URL and of which the number of characters is less than the number of the characters of the first URL.

2. The non-transitory storage medium according to claim 1,
    wherein when executed by the computer, the plurality of instructions cause the information processing apparatus to execute a two-dimensional-code-region obtaining processing in which the information processing apparatus obtains a size of a two-dimensional-code region in which a two-dimensional code is to be inserted,
    wherein the threshold value is a first value in a case where the size of the two-dimensional-code region which is obtained in the two-dimensional-code-region obtaining processing is a first size, and
    wherein the threshold value is a second value greater than the first value, in a case where the size of the two-dimensional-code region which is obtained in the two-dimensional-code-region obtaining processing is a second size greater than the first size.

3. The non-transitory storage medium according to claim 1, wherein when executed by the computer, the plurality of instructions cause the information processing apparatus to execute a number-of-printable-dots obtaining processing in which the information processing apparatus obtains a number of print dots printable by the printer within a unit distance,
    wherein the threshold value is set to a first value in a case where the number of print dots which is obtained in the number-of-printable-dots obtaining processing is a first number of dots, and
    wherein the threshold value is set to a second value greater than the first value, in a case where the number of print dots which is obtained in the number-of-printable-dots obtaining processing is a second number of dots which is greater than the first number of dots.

4. The non-transitory storage medium according to claim 1,
    wherein when executed by the computer, the plurality of instructions cause the information processing apparatus to execute a printing-medium-width obtaining processing in which the information processing apparatus obtains a width of a printing medium to be printed,
    wherein the threshold value is set to a first value in a case where the width obtained in the printing-medium-width obtaining processing is a first width, and
    wherein the threshold value is set to a second value greater than the first value, in a case where the width obtained in the printing-medium-width obtaining processing is a second width greater than the first width.

5. The non-transitory storage medium according to claim 1, wherein when executed by the computer, the plurality of instructions cause the information processing apparatus to execute the creating processing in which:
    in the case where the information processing apparatus determines in the determining processing that the number of the characters of the first URL is greater than or equal to the threshold value, the information processing apparatus determines whether the URL obtained in the obtaining processing contains a particular file type that disallows obtainment of the second URL; and
    in a case where the information processing apparatus determines that the URL contains the particular file type, the information processing apparatus lowers an error correction level and creates a third two-dimensional code storing the first URL, instead of the second two-dimensional code.

6. The non-transitory storage medium according to claim 5, wherein when executed by the computer, the plurality of instructions cause the information processing apparatus to execute the creating processing in which:
    in a case where the error correction level is lowered, the information processing apparatus determines whether the number of the characters of the first URL is less than a low-level threshold value that is greater than the threshold value used in the determining processing; and
    in a case where the information processing apparatus determines that the number of the characters of the first URL is greater than or equal to the low-level threshold value, the information processing apparatus notifies an error instead of creating the third two-dimensional code.

7. The non-transitory storage medium according to claim 6, wherein the low-level threshold value is a threshold value that is set in accordance with the lowered error correction level.

8. The non-transitory storage medium according to claim 1, wherein when executed by the computer, the plurality of instructions cause the information processing apparatus to execute the creating processing in which:
  in the case where the information processing apparatus determines in the determining processing that the number of the characters of the first URL is greater than or equal to the threshold value, determines whether the URL obtained in the obtaining processing contains a particular URL indicating a URL shortened by reducing the number of characters; and
  in a case where the information processing apparatus determines that the URL contains the particular URL, the information processing apparatus lowers an error correction level and creates a third two-dimensional code storing the first URL, instead of the second two-dimensional code.

9. The non-transitory storage medium according to claim 1, wherein when executed by the computer, the plurality of instructions cause the information processing apparatus to execute the creating processing in which:
  in the case where the information processing apparatus determines in the determining processing that the number of the characters of the first URL is greater than or equal to the threshold value, the information processing apparatus determines whether the number of the characters of the second URL is less than the threshold value; and
  in a case where the information processing apparatus determines that the number of the characters of the second URL is greater than or equal to the threshold value, the information processing apparatus lowers an error correction level and creates a third two-dimensional code storing one of the first URL and the second URL, instead of the second two-dimensional code.

10. The non-transitory storage medium according to claim 1, wherein when executed by the computer, the plurality of instructions cause the information processing apparatus to execute the determining processing and the creating processing again in a case where an instruction for increasing or reducing a size of the two-dimensional code created in the creating processing is received after the creating processing is executed.

11. The non-transitory storage medium according to claim 1, wherein when executed by the computer, the plurality of instructions cause the information processing apparatus to execute a print processing in which the information processing apparatus causes the printer to print an image storing the two-dimensional code created in the creating processing.

12. The non-transitory storage medium according to claim 11, wherein when executed by the computer, the plurality of instructions cause the information processing apparatus to perform:
  executing a combining processing in which the information processing apparatus combines the two-dimensional code created in the creating processing, with an image being edited; and
  executing the print processing in which the information processing apparatus causes the printer to print an image created by combining executed in the combining processing.

13. A two-dimensional-code creating system comprising an information processing apparatus and a printer,
  wherein the information processing apparatus comprises a controller configured to perform:
    executing an obtaining processing in which the controller obtains a URL (uniform resource locator);
    executing a determining processing in which the controller determines whether a number of characters of a first URL that is the URL obtained in the obtaining processing is less than a threshold value; and
    executing a creating processing in which:
      in a case where the controller in the determining processing determines that the number of the characters of the first URL is less than the threshold value, the controller creates a first two-dimensional code storing the first URL; and
      in a case where the controller in the determining processing determines that the number of the characters of the first URL is greater than or equal to the threshold value, the controller creates a second two-dimensional code storing a second URL which is associated with the first URL and of which the number of characters is less than the number of the characters of the first URL, and
  wherein the printer comprises a printing device configured to print, on a printing medium, an image storing the two-dimensional code created in the creating processing.

* * * * *